(12) United States Patent
Yun et al.

(10) Patent No.: US 12,126,025 B2
(45) Date of Patent: Oct. 22, 2024

(54) ELECTRODE WITH INSULATION FILM, MANUFACTURING METHOD THEREOF, AND LITHIUM SECONDARY BATTERY COMPRISING THE SAME

(71) Applicant: LG CHEM, LTD., Seoul (KR)

(72) Inventors: Hyunwoong Yun, Daejeon (KR); Hoejin Hah, Daejeon (KR); Jong Keon Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 728 days.

(21) Appl. No.: 16/978,133

(22) PCT Filed: Jan. 31, 2020

(86) PCT No.: PCT/KR2020/001508
§ 371 (c)(1),
(2) Date: Sep. 3, 2020

(87) PCT Pub. No.: WO2020/159296
PCT Pub. Date: Aug. 6, 2020

(65) Prior Publication Data
US 2021/0013512 A1   Jan. 14, 2021

(30) Foreign Application Priority Data

Feb. 1, 2019   (KR) .......................... 10-2019-0014019
Jan. 20, 2020   (KR) .......................... 10-2020-0007113

(51) Int. Cl.
*H01M 4/62*   (2006.01)
*H01M 4/13*   (2010.01)
(Continued)

(52) U.S. Cl.
CPC ............. *H01M 4/623* (2013.01); *H01M 4/13* (2013.01); *H01M 4/139* (2013.01); *H01M 4/364* (2013.01);
(Continued)

(58) Field of Classification Search
CPC ...... H01M 4/625; H01M 4/623; H01M 4/139; H01M 4/661; H01M 50/403;
(Continued)

(56) References Cited

U.S. PATENT DOCUMENTS 6,335,114 B1   1/2002   Ueshima et al.
9,698,399 B2   7/2017   Pan et al.
(Continued)

FOREIGN PATENT DOCUMENTS

CN   1393041 A   1/2003
CN   101447588 A   6/2009
(Continued)

OTHER PUBLICATIONS

EPO machine generated English translation of WO-2012043812-A1 (Year: 2012).*
(Continued)

*Primary Examiner* — Christopher P Domone
*Assistant Examiner* — Kimberly Wyluda
(74) *Attorney, Agent, or Firm* — Birch, Stewart, Kolasch & Birch, LLP (57) ABSTRACT

An electrode assembly for a lithium secondary battery including an electrode, an insulation film, a separator and a counter electrode, wherein the insulation film is formed on an entire surface of one or both sides of the electrode, and the insulation film is an organic-inorganic mixed film including inorganic particles and a binder polymer. Also discussed is a manufacturing method thereof, and a lithium secondary battery including the same.

14 Claims, 1 Drawing Sheet

(51) Int. Cl.

| | |
|---|---|
| *H01M 4/139* | (2010.01) |
| *H01M 4/36* | (2006.01) |
| *H01M 4/66* | (2006.01) |
| *H01M 10/0525* | (2010.01) |
| *H01M 10/0585* | (2010.01) |
| *H01M 50/403* | (2021.01) |
| *H01M 50/446* | (2021.01) |
| *H01M 50/451* | (2021.01) |
| *H01M 50/46* | (2021.01) |
| *H01M 4/02* | (2006.01) |

(52) U.S. Cl.
CPC ........... *H01M 4/661* (2013.01); *H01M 4/663* (2013.01); *H01M 10/0525* (2013.01); *H01M 10/0585* (2013.01); *H01M 50/446* (2021.01); *H01M 50/451* (2021.01); *H01M 50/46* (2021.01); *H01M 2004/027* (2013.01); *H01M 2004/028* (2013.01); *H01M 4/625* (2013.01); *H01M 50/403* (2021.01)

(58) Field of Classification Search
CPC ............. H01M 50/446; H01M 50/46; H01M 10/0525; H01M 2004/027; H01M 2004/028
See application file for complete search history.

(56) References Cited

U.S. PATENT DOCUMENTS

| | | | |
|---|---|---|---|
| 9,755,213 B2 | 9/2017 | Huh et al. | |
| 9,905,838 B2 | 2/2018 | Bando et al. | |
| 2002/0064710 A1 | 5/2002 | Kawakami et al. | |
| 2002/0182490 A1 | 12/2002 | Cho et al. | |
| 2006/0248710 A1 | 11/2006 | Fukumoto et al. | |
| 2009/0325057 A1 | 12/2009 | Kim et al. | |
| 2012/0052360 A1 | 3/2012 | Fujiwara et al. | |
| 2012/0301784 A1* | 11/2012 | Yano | H01M 4/505 429/213 |
| 2013/0084479 A1 | 4/2013 | Nonaka et al. | |
| 2013/0288104 A1 | 10/2013 | Kang et al. | |
| 2014/0370358 A1 | 12/2014 | Hong et al. | |
| 2015/0243964 A1 | 8/2015 | Yu et al. | |
| 2015/0364798 A1 | 12/2015 | Oshima et al. | |
| 2016/0315314 A1 | 10/2016 | Fanous et al. | |
| 2016/0344006 A1 | 11/2016 | Ota et al. | |
| 2017/0018756 A1* | 1/2017 | Kim | H01M 50/119 |
| 2017/0250400 A1 | 8/2017 | Ai et al. | |
| 2018/0145376 A1 | 5/2018 | Jo et al. | |
| 2018/0166682 A1* | 6/2018 | Lee | H01M 50/461 |
| 2018/0358649 A1 | 12/2018 | Inoue et al. | |
| 2019/0296306 A1 | 9/2019 | Sugizaki et al. | |
| 2019/0393474 A1 | 12/2019 | Lee et al. | |
| 2020/0035973 A1* | 1/2020 | Mankyuu | H01M 50/451 |
| 2020/0119333 A1 | 4/2020 | Masuzawa et al. | |
| 2020/0168940 A1 | 5/2020 | Hong et al. | |
| 2020/0235369 A1 | 7/2020 | Jeong et al. | |
| 2020/0243919 A1 | 7/2020 | Yoon et al. | |
| 2020/0403205 A1 | 12/2020 | Lee et al. | |
| 2021/0057732 A1 | 2/2021 | Teranishi | |

FOREIGN PATENT DOCUMENTS

| | | | |
|---|---|---|---|
| CN | 102386437 A | 3/2012 | |
| CN | 104769754 A | 7/2015 | |
| CN | 108475827 A | 8/2018 | |
| EP | 2 802 029 A1 | 11/2014 | |
| EP | 3 407 417 A1 | 11/2018 | |
| JP | 7-249403 A | 9/1995 | |
| JP | 2003-208891 A | 7/2003 | |
| JP | 4366783 B2 | 11/2009 | |
| JP | 2014-160635 A | 9/2014 | |
| JP | 2015-72758 A | 4/2015 | |
| JP | 2015-97159 A | 5/2015 | |
| JP | 2015-115321 A | 6/2015 | |
| JP | 5776446 B2 | 9/2015 | |
| JP | 2017-50102 A | 3/2017 | |
| JP | 6318882 B2 | 5/2018 | |
| KR | 10-1998-073911 A | 11/1998 | |
| KR | 10-0243830 B1 | 2/2000 | |
| KR | 10-2007-0108084 A | 11/2007 | |
| KR | 10-2008-0010166 A | 1/2008 | |
| KR | 10-2014-0055064 A | 5/2014 | |
| KR | 10-2015-0045786 A | 4/2015 | |
| KR | 10-2015-0046552 A | 4/2015 | |
| KR | 2015-0034564 A * | 4/2015 | |
| KR | 10-2015-0098445 A | 8/2015 | |
| KR | 10-1586530 B1 | 1/2016 | |
| KR | 10-2016-0014370 A | 2/2016 | |
| KR | 10-1603627 B1 | 3/2016 | |
| KR | 10-2016-0095354 A | 8/2016 | |
| KR | 10-2017-0064207 A | 6/2017 | |
| KR | 10-2017-0087606 A | 7/2017 | |
| KR | 10-1792572 B1 | 11/2017 | |
| KR | 10-2018-0032000 A | 3/2018 | |
| KR | 10-2018-0043183 A | 4/2018 | |
| KR | 10-2018-0058370 A | 6/2018 | |
| KR | 10-2018-0064778 A | 6/2018 | |
| KR | 10-2018-0097085 A | 8/2018 | |
| WO | WO-2012043812 A1 * | 4/2012 | ............ H01M 2/166 |
| WO | WO 2018/066184 A1 | 4/2018 | |
| WO | WO 2018/164076 A1 | 9/2018 | |

OTHER PUBLICATIONS

EPO machine generated English translation of JP 2017-050102 A (Year: 2017).*
Machine generated English translation obtained from Global Dossier of KR 2015-0034564 A (Year: 2015).*
Extended European Search Report for European Application No. 19908076.3, dated Feb. 4, 2021.
Extended European Search Report, dated May 3, 2021, for European Application No. 20749164.8.
International Search Report issued in PCT/KR2019/018311 (PCT/ISA/210), dated Apr. 3, 2020.
International Search Report issued in PCT/KR2020/001508 (PCT/ISA/210), dated May 14, 2020.

* cited by examiner

ELECTRODE WITH INSULATION FILM, MANUFACTURING METHOD THEREOF, AND LITHIUM SECONDARY BATTERY COMPRISING THE SAME

TECHNICAL FIELD

This application claims the benefits of Korean Patent Applications No. 10-2019-0014019 filed on Feb. 1, 2019 and No. 10-2020-0007113 filed on Jan. 20, 2020 with the Korean Intellectual Property Office, the disclosure of which is incorporated herein by reference in its entirety.

The present disclosure relates to an electrode assembly including an insulation film, a manufacturing method thereof, and a lithium secondary battery including the same.

BACKGROUND OF ART

With a rapid increase in the use of fossil fuels, there is a growing demand for using alternative energy or clean energy. As a part of this trend, most active research efforts have been concentrated on power generation and storage fields which use electrochemistry.

Now, a typical example of electrochemical elements using such electrochemical energy includes a secondary battery, and its use has been gradually expanding in a wide range of fields.

Recently, with much progress in and growing demand for the technological development of portable devices such as portable computers, portable telephones, cameras, and the like, there has been also a rapidly growing demand for secondary batteries as an energy source. Out of such secondary batteries, many studies have been conducted on lithium secondary batteries that are environmentally friendly and exhibit high charge and discharge characteristics as well as long life characteristics. Also, such lithium secondary batteries have been commercialized and widely used.

An electrode assembly built in a battery case is a power generation element capable of charging and discharging having a stacking structure of a positive electrode, a separator and a negative electrode. The electrode assembly is classified into: a jelly-roll type in which a separator is interposed between long sheet-type positive and negative electrodes with an active material applied thereon, all of which are then wounded together; a stack type in which a plurality of positive and negative electrodes having a pre-determined size are sequentially stacked with a separator interposed therebetween; a combination thereof, i.e., a stack/folding type in which a bi-cell or a full-cell including a positive electrode, a negative electrode and a separator is wound into a long sheet-type separation film; and a lamination/stack type in which the bi-cell or the full-cell is sequentially laminated and stacked.

Meanwhile, a lithium secondary battery generally has a structure in which a non-aqueous electrolytic solution is impregnated into an electrode assembly including a positive electrode, a negative electrode and a porous separator. In general, the positive electrode is manufactured by coating a positive electrode mixture including a positive electrode active material onto an aluminum foil, and the negative electrode is manufactured by coating a negative electrode mixture including a negative electrode active material onto a copper foil.

In general, the positive electrode active material is a lithium transition metal oxide, and the negative electrode active material is a carbon-based material. Recently, however, a lithium metal battery, which uses lithium metal itself as the negative electrode active material, has been commercialized. Furthermore, there have been actively ongoing studies on a lithium-free battery which uses a current collector only as the negative electrode upon manufacturing and subsequently receives lithium from the positive electrode by means of discharging to use lithium metal as the negative electrode active material.

Meanwhile, such lithium secondary battery has a risk of causing a short circuit due to a contact between the positive electrode and the negative electrode when being exposed to high temperatures. Also, if a large amount of electric current flows within a short period of time due to overcharge, internal/external short, local crush, etc., there is a risk of ignition/explosion as the battery is heated by means of an exothermic reaction.

In addition, as charge and discharge are repeated, the gas generated by side reactions between an electrode material and an electrolyte solution not only expands the volume of the secondary battery, but also causes safety problems such as explosion.

In particular, in the case of the lithium metal battery which uses lithium metal as the negative electrode active material, a dendrite grows as charge and discharge are repeated. As a certain level of degeneration progresses, the dendrite falls off, then flows with an electrolytic solution, and then flows out of a poorly bonded portion of the separator. After that, such fallen dendrite comes into contact with the positive electrode to cause a short circuit. In addition, as the dendrite grows, it penetrates the separator and comes into contact with the positive electrode, which results in a loss of electrochemical performance.

To address such phenomenon, an insulation tape has been attached onto an electrode tab to prevent the short circuit with the counter electrode. Alternatively, attempts have been made to prevent the short circuit between the electrodes by forming an organic-inorganic mixed coating layer on the separator, in order to prevent shrinkage of the separator due to the heat.

However, such phenomenon does not occur in the tab portion only, and the use of such insulation tape merely solves only the short circuit problem and is still insufficient to meet the demand for ensuring the safety of batteries affected by overcharge, electrolyte side reaction, and lithium dendrite growth. The formation of the organic-inorganic mixed coating layer also does not effectively solve the problem.

Accordingly, there is still a high demand for a structure capable of efficiently securing the safety of batteries by solving the problems above.

DETAILED DESCRIPTION OF THE INVENTION

Technical Problem

Accordingly, the present disclosure has been made in an effort to solve the aforesaid problems of the prior art as well as the technical objects that have been requested from the past.

Specifically, the present disclosure is to provide an electrode assembly having a structure in which an organic-inorganic mixed composition containing inorganic particles and a binder polymer is formed in the form of an insulation film on the entire electrode surface, so as to effectively prevent a short circuit with a counter electrode which may be caused by various causes, and a manufacturing method thereof.

The present disclosure is also to provide an electrode assembly capable of preventing a decrease in capacity even when the insulation film is included on the entire electrode surface while preventing the above short circuit, and a lithium secondary battery including the same.

Furthermore, the present disclosure is to provide an electrode assembly having nail penetration safety by using an insulation film containing specific inorganic particles when using an electrode containing CNT as a conductive material, and a lithium secondary battery including the same.

Technical Solution

According to an embodiment of the present disclosure, there is provided an electrode assembly for a lithium secondary battery including an electrode, an insulation film, a separator and a counter electrode, wherein an insulation film is formed on the entire surface of one or both sides of the electrode, and the insulation film is an organic-inorganic mixed film containing inorganic particles and a binder polymer.

In addition, the electrode includes a tab extending from a current collector, and the insulation film is further formed on the tab.

In this case, the insulation film formed on the tab may be formed on a portion of the tab excluding a portion connected to the external terminal.

Herein, the tab extending from the current collector may be combined to the current collector by welding and may be punched in a form extending from the current collector upon punching of the electrode.

Since the insulation film according to the present disclosure is formed on the entire surface of the electrode, the movement of lithium ions due to charging and discharging of the electrode should not be inhibited.

Therefore, the insulation film may be an organic-inorganic mixed film containing inorganic particles and a binder polymer in order to secure mobility of lithium ions. Since the organic-inorganic mixed film has better mobility of lithium ions than the separator, even if formed on the entire surface of the electrode, it is possible to inhibit a decrease in battery capacity and output performance.

The binder polymer is not limited unless it causes a side reaction with an electrolytic solution. In particular, however, the binder polymer used may be the one of which a glass transition temperature (Tg) is as low as possible, preferably in a range of −200 to 200° C. That is because such binder polymer may improve mechanical properties of a final insulation film.

Further, the binder polymer does not need to have an ion conduction capacity, but it is more preferable to use the polymer having the ion conduction capacity. If the insulation film covers a part of the electrode, the lithium ions of an active material may move even in such covered portion, which is preferable in terms of capacity.

Thus, it is preferable that the binder polymer has a high dielectric constant. Indeed, a degree of dissociation of salt in an electrolytic solution depends on the dielectric constant of an electrolytic solvent. As the dielectric constant of the polymer increases, the degree of dissociation of salt in the electrolyte may be improved. The dielectric constant of the polymer used may be 1 or more, particularly in a range of 1.0 to 100 (measurement frequency=1 kHz), and preferably 10 or more.

In addition to the functions described above, the binder polymer may have a feature of being gelled to show a high degree of swelling with an electrolytic solution, when being impregnated into the liquid electrolytic solution. Indeed, if the binder polymer is a polymer having an excellent degree of swelling with an electrolytic solution, the electrolytic solution injected after assembling of a battery permeates the polymer, and the polymer retaining the absorbed electrolytic solution comes to have an ion conduction capacity for the electrolyte. Thus, if possible, a solubility index of the polymer is preferably in a range of 15 to 45 $MPa^{1/2}$, more preferably in a range of 15 to 25 $MPa^{1/2}$ and 30 to 45 $MPa^{1/2}$. If the solubility index is less than 15 $MPa^{1/2}$ and more than 45 $MPa^{1/2}$, it becomes difficult to have swelling with the liquid electrolytic solution for a conventional battery.

Examples of such binder polymer include polyvinylidene fluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, celluloseacetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, a mixture thereof, or the like, but are not limited thereto. Any materials may be used alone or in combination, as long as they include the characteristics described above.

Meanwhile, an inorganic particle, i.e., another component which forms the insulation film makes it possible to form an empty space between inorganic particles, and plays a role to form a fine porosity and also serves as a spacer capable of maintaining a physical form. Further, the inorganic particles have a feature of not having a physical property changed even at a high temperature of 200° C., and thus the organic-inorganic mixed layer formed comes to have an excellent thermal resistance.

The inorganic particles are not particularly limited, as long as it is electrochemically stable. In other words, the inorganic particles which may be used in the present disclosure is not particularly limited, unless it causes an oxidation and/or reduction reaction in a working voltage range of a battery to be applied (e.g., 0-5V based on Li/Li+). In particular, in case of using inorganic particles having an ion transfer capacity, an ionic conductance in electrochemical elements may be increased to improve a performance, and thus the one having a high ion conductance is preferable. Further, if the inorganic particles have a high density, it is difficult to disperse such particles during preparation and there is a problem of increasing a weight when manufacturing a battery. Thus, the one having a small density is preferable, if possible. In addition, an inorganic material having a high dielectric constant contributes to an increase in a degree of dissociation of electrolytic salt in liquid electrolyte, e.g., lithium salt to improve an ion conductance of the electrolytic solution. Finally, if the inorganic particles have thermal conductivity, heat absorbing ability is excellent, so that the heat may be locally concentrated to form a heating point, thereby inhibiting a phenomenon of thermal runaway.

For the reasons described above, it is preferable that the inorganic particles are (a) high dielectric inorganic particles, of which a dielectric constant is 1 or more, 5 or more, preferably 10 or more, (b) inorganic particles having piezoelectricity, (c) thermally conductive inorganic particles, (d) inorganic particles having a lithium ion transfer capacity, or a mixture thereof.

The inorganic particles having piezoelectricity means a material which is a non-conductor at atmospheric pressure, but which has an electrified property due to a change in an internal structure when a certain pressure is applied. Such inorganic particles exhibit a high dielectric characteristic, in which a dielectric constant is 100 or more. If such inorganic particles are elongated or compressed upon the application of a certain pressure, electric charges are generated to respectively charge one side positively and the other side negatively. Thus, such particles are a material which has a function of causing a potential difference between both sides.

If the inorganic particles having the characteristics as above is used as a component of the insulation film, the particles may not only prevent both electrodes from coming into direct contact by external shock or dendritic growth, but also generate a potential difference within the particle by external shock due to piezoelectricity of the inorganic particles. Thus, an electron transfer between both electrodes, i.e., a flow of minute electric currents is made to accomplish a gradual decrease in a battery voltage, thereby improving safety.

Examples of the inorganic particles having piezoelectricity include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$(PMN-PT) hafnia ($HfO_2$), a mixture thereof or the like, but are not limited thereto.

The inorganic particles having the lithium ion transfer capacity refers to inorganic particles which have a function of containing a lithium element, but not storing lithium to move a lithium ion. The inorganic particles having the lithium ion transfer capacity may transfer and move a lithium ion due to a kind of defects present inside a structure of particle. Thus, such particles may prevent a decrease in lithium mobility caused by formation of the insulation film, thereby preventing a decrease in a battery capacity.

Examples of the inorganic particles having the lithium ion transfer capacity include: $(LiAlTiP)_xO_y$-based glass ($0<x<4$, $0<y<13$) such as lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $14Li_2O$-$9Al_2O_3$-$38TiO_2$-$39P_2O_5$, etc.; lithium germanium thiophosphate ($Li_xGe_yP_zS_w$, $0<x<4$, $0<y<1$, $0<z<1$, $0<w<5$) such as lithium lanthanum titanate ($Li_xLa_yTiO_3$, $0<x<2$, $0<y<3$), $Li_{3.25}Ge_{0.25}P_{0.75}S_4$, etc.; lithium nitride ($Li_xN_y$, $0<x<4$, $0<y<2$) such as $Li_3N$, etc.; $SiS_2$-based glass ($Li_xSi_yS_z$, $0<x<3$, $0<y<2$, $0<z<4$) such as $Li_3PO_4$—$Li_2S$—$SiS_2$, etc.; $P_2S_5$-based glass ($Li_xP_yS_z$, $0<x<3$, $0<y<3$, $0<z<7$) such as $LiI$—$Li_2S$—$P_2S_5$, etc.; a mixture thereof; or the like, but are not limited thereto.

Further, examples of the inorganic particles having a dielectric constant of 1 or more include $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, a mixture thereof or the like, but are not limited thereto.

The thermally conductive inorganic particles are a material having insulating properties, because it provides low thermal resistance but does not provide electrical conductivity. For example, the thermally conductive inorganic particles may be at least one selected from the group consisting of aluminum nitride (AlN), boron nitride (BN), alumina ($Al_2O_3$), silicon carbide (SiC), and beryllium oxide (BeO), but not limited thereto.

If the above-described high dielectric inorganic particle, inorganic particle having piezoelectricity, thermally conductive inorganic particle and inorganic particle having a lithium ion transfer capacity are mixed, their synergistic effect may be doubled.

A size of each inorganic particle is not limited, but it is preferable that the size thereof is in a range of 0.001 μm to 10 μm, if possible, in order to form an insulation film with an even thickness and form an appropriate porosity between the inorganic particles. If such size is less than 0.001 μm, dispersibility is deteriorated and thus it becomes difficult to control a property of the organic-inorganic mixed film. If such size is more than 10 μm, a thickness is increased to degrade the mechanical property and also the insulation film does not fulfill a role thereof due to an excessively large pore size, but increases a chance of causing an internal short circuit while charging and discharging a battery.

A content of the inorganic particle is not particularly limited, but it is preferable that such content is in a range of 1 wt % to 99 wt %, more preferably in a range of 10 to 95% per 100 wt % of the mixture of the inorganic particles and the binder polymer. If the content thereof is less than 1 wt %, the content of polymer becomes excessively large to decrease a pore size and a porosity due to a decrease in empty space formed between inorganic particles, and thus mobility of lithium ions may be deteriorated. In contrast, if the content thereof is more than 99 wt %, the content of polymer becomes excessively small to deteriorate a mechanical property of the final insulation film due to a weakened adhesive strength between inorganic materials.

As such, when forming the insulation film with the organic-inorganic mixed film including the binder polymer and the inorganic particles, the insulation film has an even pore structure formed by an interstitial volume between inorganic particles. Through such pore, a lithium ion is smoothly moved and a large amount of electrolytic solution is filled to show a high rate of impregnation, thereby preventing a decrease in a battery performance caused by a formation of the insulation film.

At that time, the pore size and the porosity may be controlled together by adjusting the size and content of the inorganic particle.

Further, the organic-inorganic mixed film including the inorganic particles and the binder polymer does not have a thermal contraction at high temperatures due to thermal resistance of the inorganic particles. Thus, the insulation film is maintained even under stress conditions caused by internal or external factors such as high temperatures, external shocks, etc., thereby being effective in preventing a short circuit and delaying thermal runaway due to an endothermic effect of the inorganic particles.

In addition, such an insulation film can also play a role of artificial SEI, so that also has an effect of suppressing gas generation by inhibiting side reactions of the electrolyte.

A thickness of such insulation film formed may be, for example, 0.1 to 50 μm, particularly 1 μm or more, 2 μm or more, or 3 μm or more, and may be 40 μm or less, 30 μm or less, or 20 μm or less.

If a thickness of the insulation film is too low beyond the range above, an effect of preventing a short circuit may not be achieved. If the thickness thereof is too high, it is not preferable in that an overall volume of the electrode becomes large and the mobility of lithium ions is deteriorated.

Meanwhile, the insulation film may be formed on one side or both sides of the electrode in a direction facing the counter electrode. Therefore, when the counter electrodes are laminated on both sides of the electrode, the insulation film may be formed on the entire surface of both sides, or each of the electrode and the counter electrode may include the insulation film.

That is, in one example, the insulation film may also be formed on the entire surface of the counter electrode in a direction facing the electrode, wherein the insulation film may be an organic-inorganic mixed film including inorganic particles and a binder polymer as in the insulation film formed on the electrode.

For example, when including one electrode and one counter electrode, the insulation film of the electrode is formed on one side or both sides facing the counter electrode, and the counter electrode may or may not include the insulation film.

However, when including two or more electrodes and two or more counter electrodes, more various structures are possible.

For example, when the two or more electrodes include the insulation film on only one side, one or more counter electrodes may include the insulation film so that the insulation film is formed between the counter electrode and the electrode on the other side of the electrode.

On the other hand, when the two or more electrodes include the insulation film on both sides, the counter electrode may or may not include the insulation film.

In addition, when some of the two or more electrodes include the insulation film on only one side and some include the insulation film on both sides, various structures are possible. For example, the counter electrode may include the insulation film at a position where the insulation film is not present between the electrode and the counter electrode, or the counter electrode may include the insulation film on the entire surface of one side or both sides.

That is, as long as a structure has the insulation film on the electrode and/or the counter electrode at a position where a short circuit may occur between the electrode and the counter electrode, the structure is included in the scope of the present disclosure.

After in-depth study by the present applicants, it has been confirmed that when the insulator formed on the entire electrode according to the present disclosure is in the form of an insulation film, it exhibits the best safety and does not deteriorate the characteristics of secondary battery such as capacity, ion conductivity, etc. However, when the organic-inorganic mixed composition is directly coated on the electrode, there may be a decrease in secondary battery performance, which is not preferable. This may be because the coating material is impregnated into the pores of the electrode mixture when directly coated, thereby increasing cell resistance.

Thus, in the present disclosure, it was named as an insulation film rather than an insulation layer to exclude the coated form.

The insulation film is an insulation film manufactured separately, and may be formed by laminating or transferring on the electrode. Therefore, in the present disclosure, the 'formation' of the insulation film includes 'lamination' and 'transfer'.

For clarity, an illustration according to the above structure of the present disclosure is shown in the FIGURE.

The FIGURE is an exploded perspective view of an electrode assembly according to an embodiment of the present disclosure, in which an insulation film is formed on an electrode.

Referring to the FIGURE, the electrode assembly includes an electrode 100, a counter electrode 120, a separator 110, and an insulation film 130 covering the entire surface 101 of the electrode 100 and a part of a tab 102 between the electrode 100 and the separator 110.

Meanwhile, in the present disclosure, the electrode may be a positive electrode or a negative electrode.

For example, when the electrode is a positive electrode, the counter electrode may be a negative electrode, and when the electrode is a negative electrode, the counter electrode may be a positive electrode.

When the electrode is a positive electrode or a negative electrode, the electrode may have a structure in which an electrode mixture including an electrode active material, a conductive material, and a binder is formed on at least one side of the electrode current collector. The counter electrode may have a similar structure in which an electrode mixture including an electrode active material, a conductive material, and a binder is formed on at least one side of the electrode current collector.

Alternatively, when the electrode according to the present disclosure is a positive electrode, the electrode may have a structure in which an electrode mixture including an electrode active material, a conductive material, and a binder is formed on at least one side of the electrode current collector. The counter electrode, which is a negative electrode, may have a structure in which lithium metal is deposited on the electrode current collector, or may be formed of only the electrode current collector.

Alternatively, when the electrode according to the present disclosure is a negative electrode, the electrode may have a structure in which lithium metal is deposited on the electrode current collector, or may be formed of only the electrode current collector. The counter electrode, which is a positive electrode, may have a structure in which an electrode mixture including an electrode active material, a conductive material, and a binder is formed on at least one side of the electrode current collector.

That is, a lithium ion battery, a lithium polymer battery and the like can be prepared from the electrode assembly according to the present disclosure, but a lithium metal battery using lithium metal as a negative electrode active material, a lithium free battery made of only a negative electrode current collector, etc. can be also prepared.

Meanwhile, the electrode active material included in the positive electrode is called a positive electrode active material, and the electrode current collector is called a positive electrode current collector.

The positive electrode current collector is generally manufactured to have a thickness of 3-500 μm, which is not particularly limited, as long as such current collector has a high conductivity while not causing a chemical change to the battery. For example, such current collector used may be one selected from stainless steel, aluminum, nickel, titanium, and aluminum or stainless steel surface-treated with carbon, nickel, titanium or silver, particularly aluminum. The current collector may increase an adhesive strength of the positive electrode active material in such a way that a minute unevenness is formed on a surface thereof, and may have various forms such as film, sheet, foil, net, porous body, foam body, non-woven fabric body, etc.

The positive electrode active material may include, for example, a layered compound or a compound substituted with one or more transition metals such as lithium nickel oxide ($LiNiO_2$), etc.; a lithium manganese oxide such as the chemical formula of $Li_{1+x}Mn_{2-x}O_4$ (wherein, x is 0-0.33), $LiMnO_3$, $LiMn_2O_3$, $LiMnO_2$, etc.; a lithium-copper oxide ($Li_2CuO_2$); a vanadium oxide such as $LiV_3O_8$, $LiV_3O_4$, $V_2O_5$, $Cu_2V_2O_7$, etc.; a Ni-site type lithium nickel oxide represented by the chemical formula of $LiNi_{1-x}M_xO_2$ (wherein, M=Co, Mn, Al, Cu, Fe, Mg, B or Ga and x=0.01-0.3); a lithium manganese composite oxide represented by the chemical formula of $LiMn_{2-x}M_xO_2$ (wherein, M=Co, Ni, Fe, Cr, Zn or Ta and x=0.01-0.1) or $Li_2Mn_3MO_8$ (wherein, M=Fe, Co, Ni, Cu or Zn); $LiMn_2O_4$ in which a part of Li of the chemical formula is substituted with an alkaline earth metal ion; a disulfide compound; $Fe_2(MoO_4)_3$, but not limited thereto.

Similarly, the electrode active material included in the negative electrode is called a negative electrode active material, and the electrode current collector is called a negative electrode current collector.

In general, the negative electrode current collector is made to have a thickness of 3 to 500 μm. Such negative electrode current collector is not particularly limited, as long as it has conductivity while not causing a chemical change to the battery. For example, such current collector used may be copper, stainless steel, aluminum, nickel, titan, baked carbon, copper or stainless steel surface-treated with carbon, nickel, titan, silver, etc., aluminum-cadmium alloy, etc. Further, like the positive electrode current collector above, the negative electrode current collector may increase a binding force of the negative electrode active material in such a way that a minute unevenness is formed on a surface thereof, and may be used in various forms such as film, sheet, foil, net, porous body, foam body, non-woven fabric body, etc.

Since the lithium metal battery may also be manufactured in a form in which the lithium metal itself may simultaneously perform the role of the current collector and the active material, the current collector may use lithium metal.

As the negative electrode active material, the followings may be used: for example, carbon such as hard-graphitized carbon, graphite-based carbon, etc.; a metal composite oxide such as $Li_xFe_2O_3 (0 \geq x \geq 1)$, $Li_xWO_2(0 \geq x \geq 1)$, $Sn_xMe_{1-x}Me'_yO_z$ (Me: Mn, Fe, Pb, Ge; Me': Al, B, P, Si, Group 1, 2 and 3 elements in the periodic table, halogen; $0<x \leq 1$; $1 \geq y \geq 3$; $1 \geq z \geq 8$), etc.; lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like; a conductive polymer such as polyacetylene, etc.; a Li-Co-Ni-based material, etc.

The conductive material is conventionally added in an amount of 0.1 to 30 wt %, preferably 1 to 10 wt %, more preferably 1 to 5 wt % based on a total weight of the mixture containing a positive electrode active material. Such conductive material is not particularly limited, as long as it has conductivity while not causing a chemical change to the battery, in which the followings may be used: for example, graphite such as natural graphite, artificial graphite or the like; carbon black such as carbon black, acetylene black, ketjen black, channel black, furnace black, lamp black, thermal black, etc.; conductive fiber such as carbon fabric, metal fabric or the like; metal powder such as fluorocarbon, aluminum, nickel powder, etc.; conductive whiskey such as zinc oxide, potassium titanate, etc.; conductive metal oxide such as titanium oxide, etc.; polyphenylene derivatives, carbon nanotube (CNT), etc.

The binder is a component which assists in binding of an active material, a conductive material and the like as well as binding of a current collector, and is conventionally added in an amount of 0.1 to 30 wt %, preferably 1 to 10 wt %, more preferably 1 to 5 wt % based on a total weight of the mixture containing a positive electrode active material. Examples of such binder include polyvinylidene fluoride, polyvinylidene fluoride-hexafluoropropylene, polyvinyl alcohol, carboxymethyl cellulose (CMC), starch, hydroxypropyl cellulose, regenerated cellulose, polyvinyl pyrrolidone, tetrafluoroethylene, polytetrafluoroethylene, polyethylene, polypropylene, ethylene-propylene-diene terpolymer (EPDM), sulfonated EPDM, styrene-butadiene rubber, fluoro rubber, various copolymers, etc.

Further, after in-depth study by the present applicants, it has been confirmed that when the electrode has a structure in which an electrode mixture including an electrode active material, a conductive material, and a binder is formed on at least one side of an electrode current collector, and includes carbon nanotube (CNT) as the conductive material, it is possible to achieve nail penetration safety by including the (c) thermally conductive inorganic particles as the inorganic particles in the insulation film.

That is, when CNT is included as a conductive material, it is possible to achieve high nail penetration safety with the use of the insulation film including the thermally conductive inorganic particles, compared to an insulation film including other inorganic particles.

Therefore, when CNT is included as the conductive material, it is preferable to form the insulation film including the thermally conductive inorganic particles on the surface of the electrode.

Herein, the thermally conductive inorganic particle is as described above.

Meanwhile, as a separator interposed between the positive electrode and the negative electrode, an insulating thin film having high ion permeability and mechanical strength is used. A pore diameter of the separator is generally 0.01 to 10 μm, and a thickness thereof is generally 1 to 300 μm. As the separator, the followings may be used: for example, an olefin-based polymer such as chemical resistant and hydrophobic polypropylene, etc.; a sheet or non-woven fabric made of glass fiber, polyethylene or the like; etc. If a solid electrolyte such as a polymer is used as an electrolyte, the solid electrolyte may serve as the separator, too.

Specifically, the separator may be a SRS (Safety Reinforced Separator) separator. The SRS separator has a structure in which the organic/inorganic composite porous coating layer is coated on a substrate of the polyolefin-based separator.

Inorganic particles and a binder polymer which form the organic/inorganic composite porous coating layer of the SRS separator are similar to the one described above, and the content disclosed in the present applicant's application no. 10-2009-0018123 is hereby incorporated by reference.

When the separator is the SRS separator, the separator has the same composition as, or a similar composition to, the insulation film, and thus may be seen to overlap in a structure. However, the insulation film formed on the electrode is manufactured and formed separately from the separator, and separated by a boundary with the organic/inorganic composite porous coating layer of the separator.

The conventional battery including the SRS separator still has the above-mentioned safety problems in which lithium dendrites penetrate the organic-inorganic mixed layer of the SRS separator. Therefore, the insulation film of the electrode should be separated from the SRS separator with a boundary to effectively prevent the short circuit of battery intended by the present disclosure, and to ensure safety of the battery.

More specifically, when there is an insulation film separated from the SRS separator, even if the lithium dendrites generated from the negative electrode grow vertically through the SRS separator, the dendrites may grow horizontally into a space between the insulation film and the separated SRS separator, thereby preventing the short circuit of battery.

According to another embodiment of the present disclosure, there is provided a manufacturing method of the electrode assembly, comprising the steps of:

(a) manufacturing an electrode and a counter electrode;

(b) preparing a laminate in which an organic-inorganic mixed film is laminated on a release film by coating an organic-inorganic mixed composition containing inorganic particles and a binder polymer on a release film;

(c) drying the result of (b);

(d) laminating the organic-inorganic mixed film after removing the release film from the laminate on the entire surface of the electrode in a direction facing the counter electrode, or directly transferring the organic-inorganic mixed film from the laminate on the entire surface in a direction facing the counter electrode to form an insulation film on the electrode; and (e) manufacturing an electrode assembly by interposing a SRS separator between the electrode on which the insulation film is formed and the counter electrode.

The electrode and the counter electrode of the process (a) may be manufactured to have the structure described above.

The laminate is formed in the process (b) by coating an organic-inorganic mixed composition on a release film and drying the same, wherein a coating thickness of the organic-inorganic mixed composition may be controlled to correspond to the thickness of the insulation film described above. The drying in (c) is performed for evaporation of the solvent used to prepare the organic-inorganic mixed composition, and may be performed at 70° C. to 120° C. for 5 minutes to 2 hours.

The preparation of the organic-inorganic mixed composition is similar to the preparation of the organic/inorganic composite porous coating layer of the SRS separator, and may refer to the contents thereof.

The lamination in the process (d) refers to a process of first peeling off the organic-inorganic mixed film from the release film and laminating it separately on the electrode. At this time, the lamination is possible by methods such as crimping, adhesion and the like.

The transfer in the process (d) refers to a process of directly transferring only the organic-inorganic mixed film to the electrode from the release film on which the organic-inorganic mixed film is formed. The transfer can be performed by rolling or by heat. It may be performed by laminating the laminate and the electrode so that the organic-inorganic mixed film faces the electrode, and then rolling or applying heat to transfer the organic-inorganic mixed film from the laminate to the electrode.

The process (e) is the same as the general manufacturing method of an electrode assembly known in the art.

According to another embodiment of the present disclosure, there is provide a lithium secondary battery including the electrode assembly and an electrolyte.

As the electrolyte, a non-aqueous electrolytic solution containing lithium salt is generally used, and this non-aqueous electrolytic solution includes a non-aqueous electrolytic solution and a lithium salt. As the non-aqueous electrolytic solution, the followings may be used: a non-aqueous organic solvent, an organic solid electrolyte, an inorganic solid electrolyte, etc., but not limited thereto.

As the non-aqueous organic solvent, the following aprotic organic solvents may be used: for example, N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxy furan, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc., but are not limited thereto.

As the organic solid electrolyte, the followings may be used: for example, polyethylene derivatives, polyethylene oxide derivatives, polypropylene oxide derivatives, phosphate ester polymer, poly agitation lysine, polyester sulfide, polyvinyl alcohol, polyvinylidene fluoride, a polymer including an ionic dissociable group, etc.

As the inorganic solid electrolyte, the followings may be used: for example, Li nitrides, halides, sulfates, etc. such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc.

As the lithium salt, the followings may be used as a material that may be well dissolved in the non-aqueous electrolyte: for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, lithium tetraphenyl borate, lithium imide, etc.

Further, the followings may be added into the non-aqueous electrolytic solution for the purpose of improving charge and discharge characteristics, flame resistance, etc.: for example, pyridine, triethyl phosphite, triethanolamine, cyclic ether, ethylenediamine, n-glyme, hexa phosphoric triamide, nitrobenzene derivatives, sulfur, quinoneimine dye, N-substituted oxazolidinone, N,N-substituted imidazolidine, ethylene glycol dialkyl ether, ammonium salt, pyrrole, 2-methoxy ethanol, aluminum trichloride, etc. In some cases, a halogen-containing solvent such as carbon tetrachloride, trifluoroethylene, etc. may be further included therein to give incombustibility, carbon dioxide gas may be further included therein to improve preservative characteristics at high temperatures, and FEC (Fluoro-Ethylene Carbonate), PRS (Propene sultone), etc. may be further included, too.

As described above, the lithium secondary battery according to the present disclosure may be a lithium ion battery, a lithium polymer battery, a lithium metal battery, or a lithium free battery.

At that time, the lithium metal battery and the lithium-free battery are particularly likely to have a formation of lithium dendrites, and thus are suitable for the present disclosure, and more suitable when including the electrode according to the present disclosure.

Such lithium secondary battery may be used as a power source of devices. The devices may be, for example, laptop computers, netbooks, tablet PCs, mobile phones, MP3, wearable electronic devices, power tools, electric vehicles (EV), hybrid electric vehicles (HEV), plug-in hybrid electric vehicles (PHEV), e-bikes, e-scooters, electric golf carts or electric power storage systems, but not limited thereto.

BRIEF DESCRIPTION OF THE DRAWINGS

The FIGURE is an exploded perspective view of an electrode, a separator and a counter electrode according to an embodiment of the present disclosure.

DETAILED DESCRIPTION OF THE EMBODIMENTS

Figure 1:
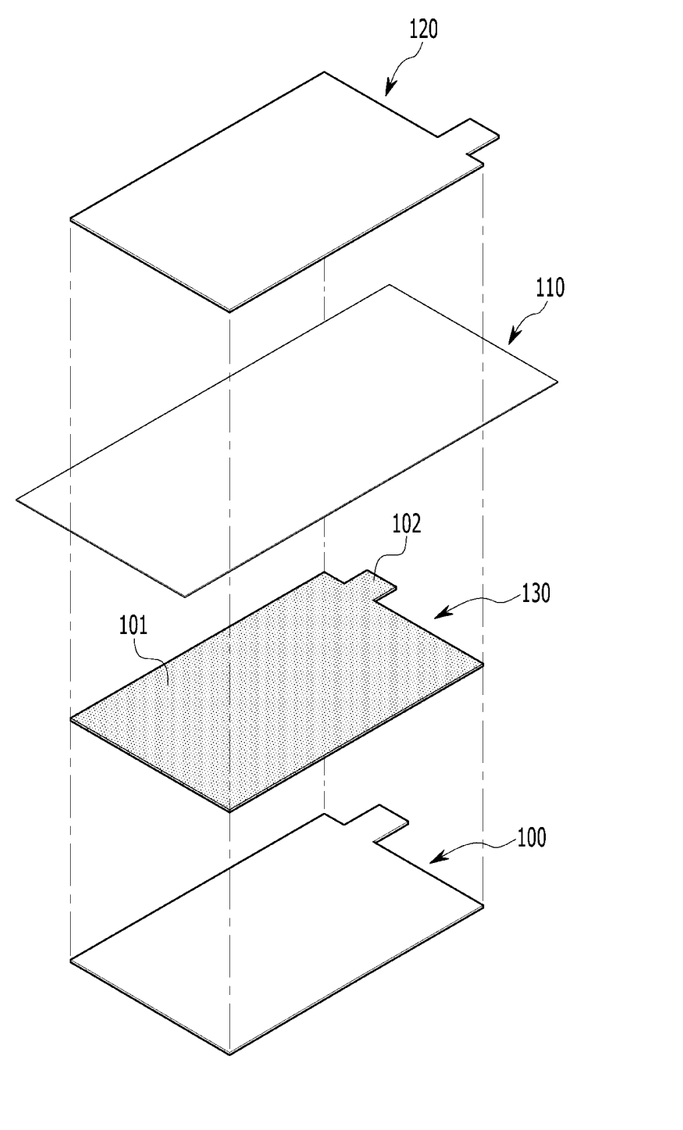

Hereinafter, the present invention will be described in detail with reference to the following examples. However, such examples are provided only for better understanding of the present invention, and thus the scope of the present invention is not limited thereto.

Preparation Example 1

Organic Layer

Polyvinylidenefluoride-chlorotrifluoroethylene copolymer (PVdF-CTFE) was added into acetone in an amount of about 5 wt %, then dissolved at a temperature of 50° C. for about 12 hours to prepare a polymer solution.

Preparation Example 2

Organic-Inorganic Mixed Layer for Coating $BaTiO_3$ powder was added into the polymer solution of Preparation Example 1 above to reach $BaTiO_3$/PVdF-CTFE=90/10 (wt % ratio), and then the resulting $BaTiO_3$ powder was crushed and pulverized by a ball mill method for 12 hours or more to prepare an organic-inorganic mixed composition. A particle diameter of the $BaTiO_3$ may be controlled depending on a size (particle size) of beads used in the ball mill method and a time applied for the ball mill method. In this Preparation Example, such $BaTiO_3$ powder was pulverized at about 400 nm to prepare the organic-inorganic mixed composition.

Preparation Example 3

Organic-Inorganic Mixed Film for Insulation Film

The organic-inorganic mixed composition prepared in Preparation Example 2 was coated on a PET release film in a thickness of 10 μm, and dried to prepare a laminate in which an organic-inorganic mixed film is formed on a release film.

Preparation Example 4

Preparation of SRS Separator

Polyvinylidenefluoride-chlorotrifluoroethylene copolymer (PVdF-CTFE) polymer was added into acetone in an amount of about 5 wt %, then dissolved at a temperature of 50° C. for about 12 hours to prepare a polymer solution. $BaTiO_3$ powder was added into such polymer solution to reach $BaTiO_3$/PVdF-CTFE=90/10 (wt % ratio), and then the resulting $BaTiO_3$ powder was crushed and pulverized by a ball mill method for 12 hours or more to prepare a slurry. A particle diameter of the slurry prepared as above may be controlled depending on a size (particle size) of beads used in the ball mill method and a time applied for the ball mill method. In this Example 1, such $BaTiO_3$ powder was pulverized at about 400 nm to prepare the slurry. The slurry prepared as above was coated on a polyethylene separator with a thickness of about 18 μm (porosity 45%) by using a dip coating method, and a thickness of coating was adjusted to about 3.5 μm. The resulting separator was dried at 60° C. to form an active layer. As a result of measuring a porosity with a porosimeter, the size and porosity of pores in the active layer coated onto the polyethylene separator were 0.5 μm and 58%, respectively.

Example 1

A positive electrode mixture having a composition of 95 wt % of a positive electrode active material ($LiNi_{0.6}Co_{0.2}Mn_{0.2}O_2$), 2.5 wt % of Super-P (conductive material) and 2.5 wt % of PVDF (binder) was added into a solvent, i.e., NMP (N-methyl-2-pyrrolidone) to prepare a positive electrode slurry, which was then coated (100 μm) on an aluminum current collector, and then one aluminum tab was welded onto an uncoated portion of the current collector to prepare a positive electrode.

A negative electrode slurry was prepared by adding a negative electrode mixture of 85 wt % of a negative electrode active material (artificial graphite: MCMB), 10 wt % of Super-P (conductive material), and 5 wt % of PVDF (binder) to NMP (solvent). Then, the slurry was coated (100 μm) on a copper current collector, and then one copper tab was welded onto an uncoated portion of the current collector to prepare a negative electrode.

The positive electrode was prepared such that a portion excluding the tab to be 3.0×4.5 cm in size. The negative electrode was prepared such that a portion excluding the tab to be 3.1×4.6 cm in size. An insulation film was formed by transferring the organic-inorganic mixed film to a portion excluding the tab of the negative electrode using the laminate of Preparation Example 3.

The transfer was carried out by laminating the laminate so that the organic-inorganic mixed film faced to the portion excluding the tab of the negative electrode, and then performing rolling with a rolling mill.

The SRS separator obtained from Preparation Example 4 was interposed between the positive electrode and the negative electrode to prepare an electrode assembly (bi-cell), after which the electrode assembly was inserted into a pouch-type case and an electrode lead was connected thereto. Then, a dimethyl ether (DME) solution in which 4 M of $LiPF_6$ was dissolved was infused thereto as an electrolyte, and then sealed to assemble a lithium secondary battery.

Example 2

A lithium secondary battery was assembled in the same manner as in Example 1, except that the insulation film was formed by transferring the organic-inorganic mixed film to a portion excluding the tab of the positive electrode instead of the negative electrode using the laminate of Preparation Example 3.

Example 3

A lithium secondary battery was assembled in the same manner as in Example 1, except that the insulation film was formed by transferring the organic-inorganic mixed film to a portion including the tab of the negative electrode using the laminate of Preparation Example 3.

Example 4

A lithium secondary battery was assembled in the same manner as in Example 1, except that the insulation film was formed by transferring the organic-inorganic mixed film to a portion including the tab of the positive electrode instead of the negative electrode using the laminate of Preparation Example 3.

Comparative Example 1

A lithium secondary battery was assembled in the same manner as in Example 1, except that no insulation film was formed on the negative electrode and the positive electrode.

Comparative Example 2

A lithium secondary battery was assembled in the same manner as in Example 2, except that the insulation film was formed by coating the organic-inorganic mixed composition of Preparation Example 2 onto a portion excluding the tab of the positive electrode in a thickness of 10 μm and drying at 60° C. without using the laminate of Preparation Example 3.

Comparative Example 3

A lithium secondary battery was assembled in the same manner as in Example 2, except that the insulation film was formed by coating the polymer solution of Preparation Example 1 onto a portion excluding the tab of the positive electrode in a thickness of 10 pm and drying at 60° C. without using the laminate of Preparation Example 3.

Comparative Example 4

A lithium secondary battery was assembled in the same manner as in Example 1, except that no insulation film was formed on the negative electrode and the positive electrode, and an insulation tape (PET material, 3M, thickness: 30μm) was attached only onto the tab portion of the positive electrode.

Experimental Example 1

To identify the safety of the lithium secondary batteries manufactured in Examples 1 to 4 and Comparative Examples 1 to 4, an amount of gas generated at 200 cycles and a voltage drop phenomenon which happens upon the occurrence of short circuit were identified while a life evaluation at a high temperature (45° C.) was performed.

The life evaluation was performed by repeating charge and discharge at 1.0 C until 500 cycles in a 2.5-4.35 V section.

The results are shown in the following Table 1.

TABLE 1

| | Amount of gas generated (ul) | Occurrence rate of short circuit before 500 cycles (occurrence of short circuit/ the number of evaluation) |
|---|---|---|
| Example 1 | 520 | 0/30 |
| Example 2 | 510 | 1/30 |
| Example 3 | 530 | 0/30 |
| Example 4 | 527 | 0/30 |
| Comparative Example 1 | 950 | 3/30 |
| Comparative Example 2 | 530 | 1/20 |
| Comparative Example 3 | 590 | 1/20 |
| Comparative Example 4 | 980 | 2/20 |

Referring to Table 1, it was confirmed in the case of forming the insulation film according to the present disclosure that the amount of gas generated was reduced by reducing the oxidation/reduction decomposition of the electrolyte, and the internal short circuit caused by lithium dendrites was also reduced.

However, when the insulation film was not formed on the tab portion of the positive electrode due to the difference in area of the positive electrode and the negative electrode (Example 2), a part of the positive electrode tab could face the negative electrode, so that the short circuit might occur. Therefore, it is more preferable to form the insulation film up to the tab portion.

On the other hand, it was confirmed in Comparative Example 1 in which the insulation film was not formed or in Comparative Example 4 in which the insulation tape was attached only on the tab that a large amount of gas was generated and the internal short circuit could not be effectively prevented. Comparative Examples 2 and 3 seemed to be effective in suppressing short circuits and reducing the amount of gas generated, but were inferior to the structure according to the present disclosure, and there is a problem of a decrease in secondary battery performance as shown in the following experiments.

Comparative Example 5

A lithium secondary battery was assembled in the same manner as in Example 2, except that an insulation layer was formed by coating the organic-inorganic mixed composition of Preparation Example 2 onto a portion excluding the tab of the positive electrode in a thickness of 10 μm and drying at 60° C., and then an insulation film was formed by coating the polymer solution of Preparation Example 1 in a thickness of 10 μm and drying at 60° C.

Experimental Example 2

The lithium secondary batteries prepared in Example 2 and Comparative Examples 2, 3, 4, and 5 were charged and discharged at 0.1 C three times in a 2.5 V~4.5 V section, and then charged at 0.1 C and discharged at 2 C three times to obtain average discharge capacity at 2 C/average discharge capacity at 0.1 C in %. The results are shown in Table 2 below.

TABLE 2

| | Capacity retention (%) |
|---|---|
| Example 2 | 93 |
| Comparative Example 2 | 65 |
| Comparative Example 3 | 55 |
| Comparative Example 4 | 78 |
| Comparative Example 5 | 70 |

Referring to Table 2, when using the insulation film according to the present disclosure, there was almost no decrease in capacity. However, when forming an insulation layer in the form of coating rather than the insulation film (Comparative Examples 2 and 3), and when the insulation tape was attached only onto the positive electrode tab (Comparative Example 4), the capacity was reduced. Further, even when the organic-inorganic insulation layer and the organic layer were used together, resistance was increased, thereby reducing the capacity retention.

Experimental Example 3

In order to confirm the safety improvement, the lithium secondary batteries prepared in Example 3 and Comparative Examples 1 and 3 were subjected to a hot box test while increasing the temperature of the batteries at a rate of 5° C./min from 130° C. for 1 hour. The results are shown in Table 3 below.

TABLE 3

| | Explosion temperature (° C.) |
|---|---|
| Example 3 | 197 |
| Comparative Example 1 | 178 |
| Comparative Example 3 | 180 |

Referring to Table 3, when forming the insulation film according to the present disclosure, it could withstand up to a higher temperature than the case where the insulation film was not formed (Comparative Example 1), the case where a polymer insulation layer was formed (Comparative Example 3), and the case where an organic layer was used (Comparative Example 3), thereby exhibiting excellent safety.

Example 5

A positive electrode was prepared in the same manner as in Example 1, except that carbon nanotube (CNT) was used as the conductive material in the production of the positive electrode.

A negative electrode was prepared in the same manner as in Example 1.

The positive electrode was prepared such that a portion excluding the tab to be 3.0×4.5 cm in size. The negative electrode was prepared such that a portion excluding the tab to be 3.1×4.6 cm in size. An insulation film was formed by transferring the organic-inorganic mixed film to a portion including the tab of the positive electrode using the laminate of Preparation Example 3.

The transfer was carried out by laminating the laminate so that the organic-inorganic mixed film faced to the portion excluding the tab of the negative electrode, and then performing rolling with a rolling mill.

The SRS separator obtained from Preparation Example 4 was interposed between the positive electrode and the negative electrode to prepare an electrode assembly (bi-cell), after which the electrode assembly was inserted into a pouch-type case and an electrode lead was connected thereto. Then, a dimethyl ether (DME) solution in which 4 M of $LiPF_6$ was dissolved was infused thereto as an electrolyte, and then sealed to assemble a lithium secondary battery.

Preparation Example 5

AlN (aluminum nitride) powder was added to the polymer solution of Preparation Example 1 to reach AlN/PVdF-CTFE=90/10 (wt % ratio), and then the resulting AlN powder was crushed and pulverized by a ball mill method for 12 hours or more to prepare an organic-inorganic mixed composition. A particle diameter of the AlN may be controlled depending on a size (particle size) of beads used in the ball mill method and a time applied for the ball mill method. In this Preparation Example, such AlN powder was pulverized at about 400 nm to prepare the organic-inorganic mixed composition. The organic-inorganic mixed composition thus prepared was coated on a PET release film and dried to prepare a laminate in which an organic-inorganic mixed film is formed on a release film.

Example 6

A lithium secondary battery was assembled in the same manner as in Example 5, except that the positive electrode and the negative electrode were prepared as in Example 5 but the insulation film was formed by transferring the organic-inorganic mixed film to a portion including the tab of the positive electrode using the laminate of Preparation Example 5.

Comparative Example 6

A lithium secondary battery was assembled in the same manner as in Example 5, except that the positive electrode and the negative electrode were prepared as in Example 5 but no insulation film was formed on the positive electrode and the negative electrode.

Experimental Example 4

In order to confirm the safety improvement, the lithium secondary batteries prepared in Examples 4 to 6 and Comparative Examples 1 and 6 were subjected to a nail penetration test at 6 m/min with a 25 mm diameter nail, and the results are shown in Table 4 below. The case where ignition did not occur when penetrating the nail was identified as 'pass', and the case where ignition occurred was identified as 'fail'.

TABLE 4

| | The number of pass/ the number of evaluation |
|---|---|
| Example 4 | 5/5 |
| Example 5 | 3/5 |
| Example 6 | 5/5 |
| Comparative Example 1 | 3/5 |
| Comparative Example 6 | 0/5 |

Referring to Table 4, in the case of including no CNT as the conductive material (Example 4), the nail penetration safety was excellent even with an insulation film using any inorganic particles. However, in the case of including CNT as the conductive material (Examples 5 and 6), the nail penetration safety could be ensured only when the thermally conductive inorganic particles were used as the inorganic particles, otherwise the safety was somewhat reduced.

On the other hand, when the insulation film was not formed, the safety was lowered in any case. In particular, when using CNT as the conductive material, it was confirmed that the safety was extremely reduced.

It is to be understood that those skilled in the art to which the present invention pertains may carry out various applications and modifications based on the descriptions above within the scope of the present invention.

INDUSTRIAL APPLICABILITY

As described above, the electrode assembly according to the present disclosure may prevent a short circuit between electrodes caused by internal/external short circuit, local crush, and the like by including an insulation film on the entire surface of one or both sides.

In addition, as the electrode assembly according to the present disclosure includes an organic-inorganic mixed film on the surface of the electrode, it can function as artificial SEI to inhibit side reactions of electrolyte that may be caused by the contact between electrode materials and the electrolyte. Therefore, the battery safety may be improved by inhibiting gas generation and lithium ions may move, thereby preventing a reduction in capacity and output characteristics.

In addition, since the present disclosure forms an insulation film separately on the surface of the electrode, not in the form of coating, it is possible to prevent a decrease in battery performance, which may occur when coating materials are incorporated into pores of the surface of the electrode.

Further, the insulation film included in the electrode assembly according to the present disclosure includes a particular inorganic material, and this inorganic material has an endothermic effect, thereby delaying thermal runaway.

The invention claimed is:

1. An electrode assembly for a lithium secondary battery comprising:
    an electrode comprising a current collector and a tab extending from the current collector, the tab having a first surface and a second surface opposite the first surface;
    an insulation film;
    a separator; and
    a counter electrode,
    wherein the insulation film is formed on an entire surface of one side of the electrode and formed on only the first surface of the tab, and the first surface of the tab and the one side of the electrode are the same side, and the insulation film is integrally formed on the first surface of the tab and the one side of the electrode, and
    wherein the insulation film is an organic-inorganic mixed film comprising inorganic particles and a binder polymer.

2. The electrode assembly of claim 1, wherein the inorganic particles are at least one selected from the group consisting of (a) inorganic particles having a dielectric constant of 1 or more, (b) inorganic particles having piezoelectricity, (c) thermally conductive inorganic particles, and (d) inorganic particles having a lithium ion transfer capability.

3. The electrode assembly of claim 1, wherein the binder polymer is at least one selected from the group consisting of polyvinylidene fluorideco-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyimide, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose and polyvinylalcohol.

4. The electrode assembly of claim 1, wherein a content of the inorganic particles is 1 wt % to 99 wt % per 100 wt % of a mixture of the inorganic particles and the binder polymer.

5. The electrode assembly of claim 1, wherein the insulation film has a thickness of 0.1 μm to 50 μm.

6. The electrode assembly of claim 1, wherein the insulation film is formed on the entire electrode surface in a direction facing the counter electrode.

7. The electrode assembly of claim 1, wherein an additional insulation film is formed on an entire surface of the counter electrode in a direction facing the electrode, and the additional insulation film is an organic-inorganic mixed film comprising inorganic particles and a binder polymer.

8. The electrode assembly of claim 1, wherein the electrode is a positive electrode and the counter electrode is a negative electrode.

9. The electrode assembly of claim 1, wherein the electrode is a negative electrode and the counter electrode is a positive electrode.

10. The electrode assembly of claim 1, wherein the electrode comprises an electrode mixture comprising an electrode active material, a conductive material, and a binder formed on at least one side of an electrode current collector, and the conductive material comprises carbon nanotubes, and the insulation film comprises thermally conductive inorganic particles as the inorganic particles.

11. The electrode assembly of claim 10, wherein thermally conductive inorganic particles are at least one selected from the group consisting of aluminum nitride, boron nitride, alumina, silicon carbide, and beryllium oxide.

12. The electrode assembly of claim 1, wherein the separator is a Safety Reinforced Separator (SRS) separator.

13. A manufacturing method of the electrode assembly of claim 1, comprising the steps of:
    (a) manufacturing an electrode and a counter electrode, wherein they separately comprise a current collector and a tab extending from the current collector, the tab having a first surface and a second surface opposite the first surface;
    (b) preparing a laminate wherein an organic-inorganic mixed film is laminated on a release film by coating an organic-inorganic mixed composition comprising inorganic particles and a binder polymer on a release film;
    (c) drying the result of (b);
    (d) laminating the organic-inorganic mixed film, after removing the release film from the laminate, on an entire surface of the electrode and on only the first surface of the tab in a direction facing the counter electrode, or directly transferring the organic-inorganic mixed film from the laminate on the entire surface and on only the first surface of the tab in the direction facing the counter electrode to form an insulation film on the electrode; and
    (e) manufacturing an electrode assembly by interposing a Safety Reinforced Separator (SRS) separator between the electrode having the insulation film and the counter electrode.

14. A lithium secondary battery comprising:
the electrode assembly according to claim 1; and
an electrolyte.

* * * * *